United States Patent
Lin

(10) Patent No.: US 9,420,655 B2
(45) Date of Patent: Aug. 16, 2016

(54) METHOD OF DRIVING LED CHIPS OF SAME POWER BUT DIFFERENT RATED VOLTAGES AND CURRENTS

(71) Applicant: HEP TECH CO., LTD., Taichung (TW)

(72) Inventor: Ming-Feng Lin, Taichung (TW)

(73) Assignee: HEP TECH CO., LTD., Taichung (TW)

( * ) Notice: Subject to any disclaimer, the term of this patent is extended or adjusted under 35 U.S.C. 154(b) by 45 days.

(21) Appl. No.: 14/338,178

(22) Filed: Jul. 22, 2014

(65) Prior Publication Data

US 2015/0077020 A1 Mar. 19, 2015

(30) Foreign Application Priority Data

Sep. 16, 2013 (TW) .............................. 102133504 A

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |
| H05B 41/282 | (2006.01) |

(52) U.S. Cl.
CPC ........ *H05B 33/0845* (2013.01); *H05B 33/0815* (2013.01); *H05B 33/0848* (2013.01); *H05B 33/0851* (2013.01); *H05B 37/02* (2013.01); *H05B 41/2828* (2013.01); *Y02B 20/346* (2013.01); *Y02B 20/347* (2013.01)

(58) Field of Classification Search
CPC ........... H05B 33/0815; H05B 33/0851; H05B 33/0848; H05B 37/02; H05B 41/2828; H05B 41/3927; Y02B 20/347; Y02B 20/346; H02M 3/156; H02M 3/33507
USPC .................. 315/307, 291, 224, 308; 323/282; 363/21.01, 21.09
See application file for complete search history.

(56) References Cited

U.S. PATENT DOCUMENTS

| | | | | |
|---|---|---|---|---|
| 2010/0243897 | A1* | 9/2010 | Madhani | ............... G01S 7/4814 250/338.4 |
| 2012/0074871 | A1* | 3/2012 | Wanda | ............... H05B 41/2885 315/309 |
| 2014/0285103 | A1* | 9/2014 | Acharya | ............ H05B 33/0812 315/206 |
| 2015/0282268 | A1* | 10/2015 | Hua | ................... H05B 33/0845 315/307 |

\* cited by examiner

*Primary Examiner* — Alexander H Taningco
*Assistant Examiner* — Christian L Garcia
(74) *Attorney, Agent, or Firm* — Ming Chow; Sinorica, LLC

(57) ABSTRACT

A method of driving LED chips of same power but different rated voltages and currents includes the following steps: set a predetermined power; provide a LED chip which has a rated power accordant to the predetermined power; measure the LED chip to obtain a working current thereof while the LED chip is operated; provides a driving current to the LED chip, and maintain the driving current the same as the working current.

12 Claims, 4 Drawing Sheets

METHOD OF DRIVING LED CHIPS OF SAME POWER BUT DIFFERENT RATED VOLTAGES AND CURRENTS

The current application claims a foreign priority to the patent application of Taiwan No. 102133504 filed on Sep. 16, 2013.

BACKGROUND OF THE INVENTION

1. Technical Field

The present invention relates generally to driving LEDs, and more particularly to a method of driving LED chips of same power but different rated voltages and currents.

2. Description of Related Art

Typically, a LED (light-emitting diode) device includes a LED chip and a driving apparatus, wherein the driving apparatus provides power to the LED chip. There are various types of LED chips in the current market, and LED chips of different specifications may respectively have different rated voltage and rated current, even for those of the same power. For example, a LED chip of 28 W is probably to have the following combinations of rated voltage and rated current: 80V/350 mA, 56V/500 mA, 40V/700 mA, etc. Conventionally, a driving apparatus merely fits one specific specification, and therefore could drive only LED chips of the same specification. Thus, since there are all kinds of LED chips of different specifications, the inventory pressure of driving apparatuses is high for manufacturers. And given that manufacturers have to produce driving apparatuses to drive LED chips of as many specifications as possible, the quantities of each type of driving apparatus is limited, and therefore the price and the manufacturing cost is unlikely to be lowered. If a driving apparatus able to drive LED chips of same power but different rated voltages and different rated currents can be provided, the inventory pressure and the manufacturing cost of driving apparatuses will be effectively reduced.

BRIEF SUMMARY OF THE INVENTION

In view of the above, the primary objective of the present invention is to provide a method of driving LED chips of same power but different rated voltages and currents, which is able to maintain the power provided to the LED chips within a predetermined range.

The method of driving LED chips of same power but different rated voltages and currents provided in the present invention includes the following steps: set a predetermined power; provide a LED chip which has a rated power accordant to the predetermined power; obtain a working current of the LED chip while the LED chip is operated at the predetermined power; provide a driving current to the LED chip, and maintain the driving current the same as the working current.

Whereby, LED chips of the same power but different rated currents and voltages can be driven with the method provided in the present invention, and the power provided to the LED chips can be maintained within the predetermined range. The method effectively improves the inconveniences due to the conventional way that one kind of driving apparatus only drives LED chips of the same specification.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
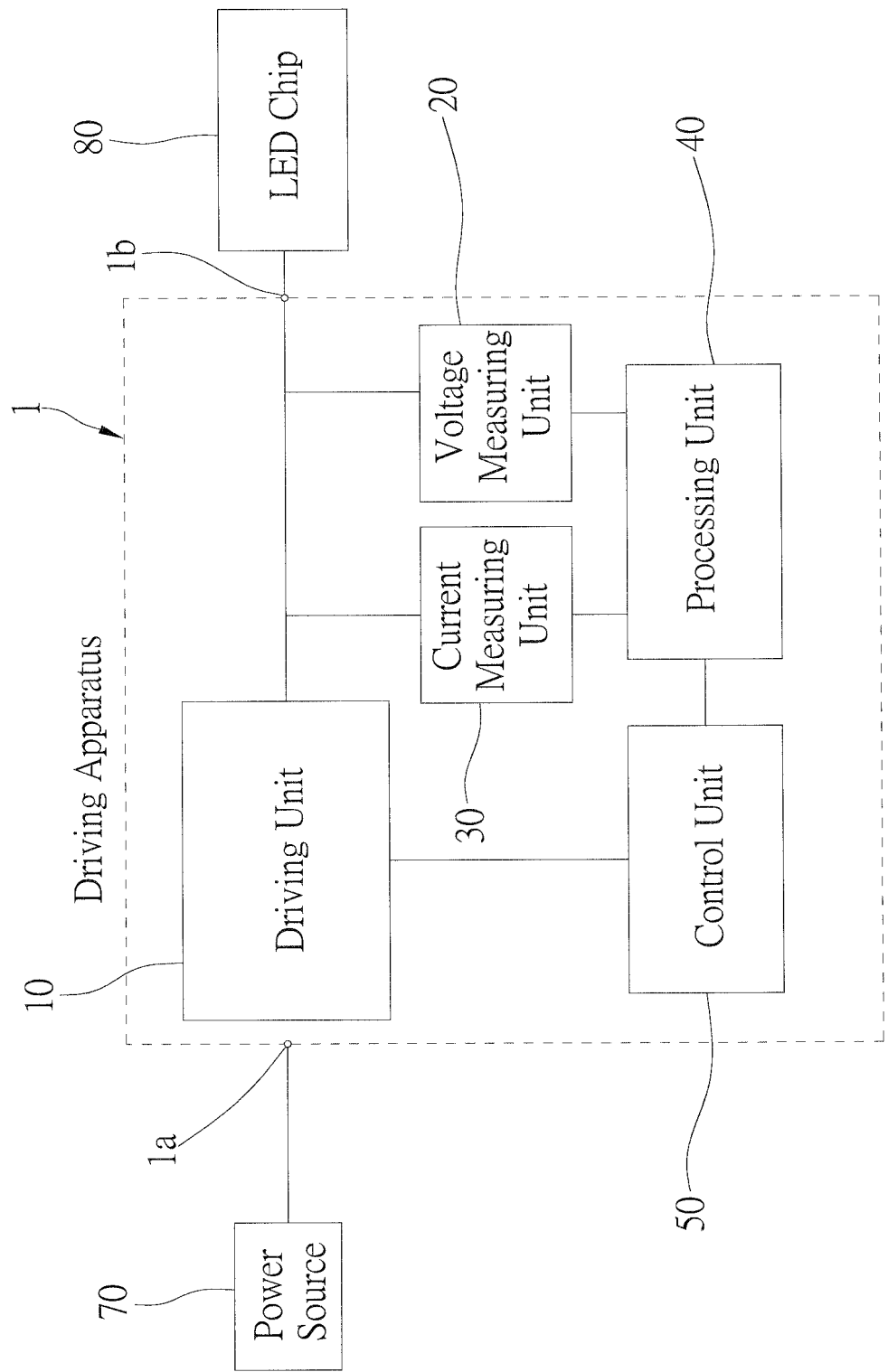
FIG. 1 is a block diagram of a first preferred embodiment of the present invention.

As shown in FIG. 1, a driving apparatus 1 for driving LED chips of the first preferred embodiment of the present invention includes an input port 1a, an output port 1b, a driving unit 10, a voltage measuring unit 20, a current measuring unit 30, a processing unit 40, and a control unit 50.

The input port 1a is electrically connected to a power source, and the output port 1b is provided to electrically connect to a LED chip 80. The driving unit 10 is electrically connected to the input port 1a and the output port 1b. After the LED chip 80 is electrically connected to the output port 1b, the driving unit 10 receives power from the power source 70, and outputs a driving voltage and a driving current to the LED chip 80. The driving unit 10 controllably regulates the driving voltage and the driving current. In practice, the design of the driving unit 10 could be based on PWM, half-bridge, buck, or boost circuits.

The voltage measuring unit 20 is electrically connected to the driving unit 10 and the output port 1b to detect the driving voltage provided to the LED chip 80 by the driving unit 10. The current measuring unit 30 is also electrically connected to the driving unit 10 and the output port 1b to detect the driving current provided to the LED chip 80 by the driving unit 10.

The processing unit 40 is electrically connected to the voltage measuring unit 20 and the current measuring unit 30. Also, the processing unit 40 is electrically connected to the driving unit 10 through the control unit 50. The processing unit 40 transmits a current controlling signal to the driving unit 10 through the control unit 50 according to the detection result of the voltage measuring unit 20 and the current measuring unit 30, and the driving unit 10 is controlled to regulate the driving current accordingly.

Figure 2:
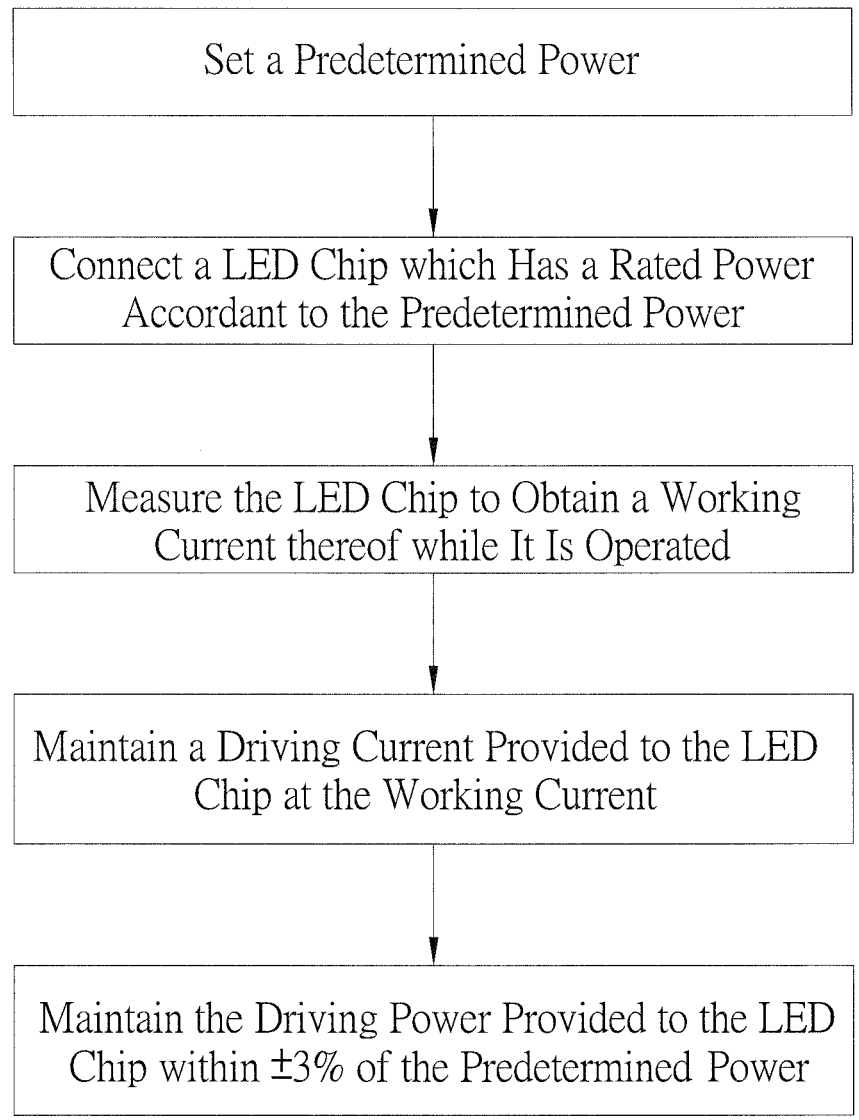
FIG. 2 is a flow chart of the first preferred embodiment of the present invention.

Whereby, a method of driving LED chips can be applied with the aforementioned driving apparatus 1, wherein the method includes the following steps shown in FIG. 2:

A. Set a predetermined power in the processing unit 40, wherein the driving apparatus 1 provides a power of the predetermined power.

B. Connect a LED chip 80 which has a rated power accordant to the predetermined power. In the first preferred embodiment, the rated power of the LED chip 80 equals the predetermined power. For example, though the LED chips of specifications of 80V/350 mA, 56V/500 mA, and 40V/700 mA have different rated voltages and rated currents, they have the same rated power, which is 28 W, and therefore any one of the listed LED chips can be selected to be the LED chip 80 connected to the driving unit 10. In practice, the rated power of the selected LED chip 80 is compatible to be in a range between 90% and 110% of the predetermined power. In other words, for the predetermined power of 28 W, the rated power of the selected LED chip 80 can be in a range between 25.2 W and 30.8 W.

C. Measure the LED chip 80 to obtain a working current thereof while the LED chip 80 is operated. In the first preferred embodiment, the LED chip 80 is electrically connected to the driving unit 10 first, and then the processing unit 40 transmits the current controlling signal to the driving unit 10 through the control unit 50, wherein the driving unit 10 is controlled to gradually increases the driving current provided to the LED chip 80 from an initial current which is lower than the working current. Meanwhile, the processing unit 40 obtains a product of the driving voltage and the driving current through the detection of the voltage measuring unit 20 and the current measuring unit 30, wherein the product is the driving power provided to the LED chip 80. It is obvious to see that the driving voltage is increased along with the increasing driving current provided by the driving unit 10. As a result, the driving power provided to the LED chip 80 is continuously increased as well. Once the driving power reaches the predetermined power, the driving current stops being increased, and the driving current at this time point equals the working current required for achieving the predetermined power.

D. Transmit the current controlling signal from the processing unit 40 to the driving unit 10 through the control unit 50, wherein the driving current is controlled to maintain the driving current the same as the working current, and therefore to provide the driving power of the predetermined power to the LED chip 80. In this way, the LED chip 80 is operated at a constant power, which means that the product of the driving voltage and the driving current is maintained the same as the predetermined power set in step A.

E. Maintain the driving power provided to the LED chip 80 within a predetermined range, wherein the predetermined power is in the predetermined range. In the first preferred embodiment, the processing unit 40 continuously obtains the driving power, which is the product of the driving voltage and the driving current, through the detection results of the voltage measuring unit 20 and the current measuring unit 30. The processing unit 40 controls the driving unit 10 through the control unit 50 to increase or decrease the driving current provided to the LED chip 80, in order to maintain the driving power not to exceed the predetermined range, which is a range between 97% and 103%, of the predetermined power. Whereby, the driving power provided to the LED chip 80 can be stabilized.

With the aforementioned method, the driving apparatus 1 is able to measure the connected LED chip 80 to obtain the working current required for the LED chip 80 to be operated at the driving power the same as the predetermined power. For any other LED chip of different rated voltage and different rated current, as long as its rated power is accordant to the predetermined power, it is compatible to the driving apparatus 1.

In an embodiment, the method of driving LED chips further includes to maintain the driving voltage provided to the LED chip 80 no higher than an upper voltage limitation by transmitting a voltage restriction signal to the driving unit 10 from the processing unit 40 when the voltage measuring unit 20 detects that the driving voltage exceeds the upper voltage limitation. Similarly, the method of driving LED chips further includes to maintain the driving current provided to the LED chip 80 no higher than an upper current limitation by transmitting a current restriction signal to the driving unit 10 from the processing unit 40 when the current measuring unit 30 detects that the driving current exceeds the upper current limitation. Whereby, the LED chip 80 or the driving unit 10 can be protected from being damaged by abnormal driving voltage or driving current outputted from the driving unit 10.

Figure 3:
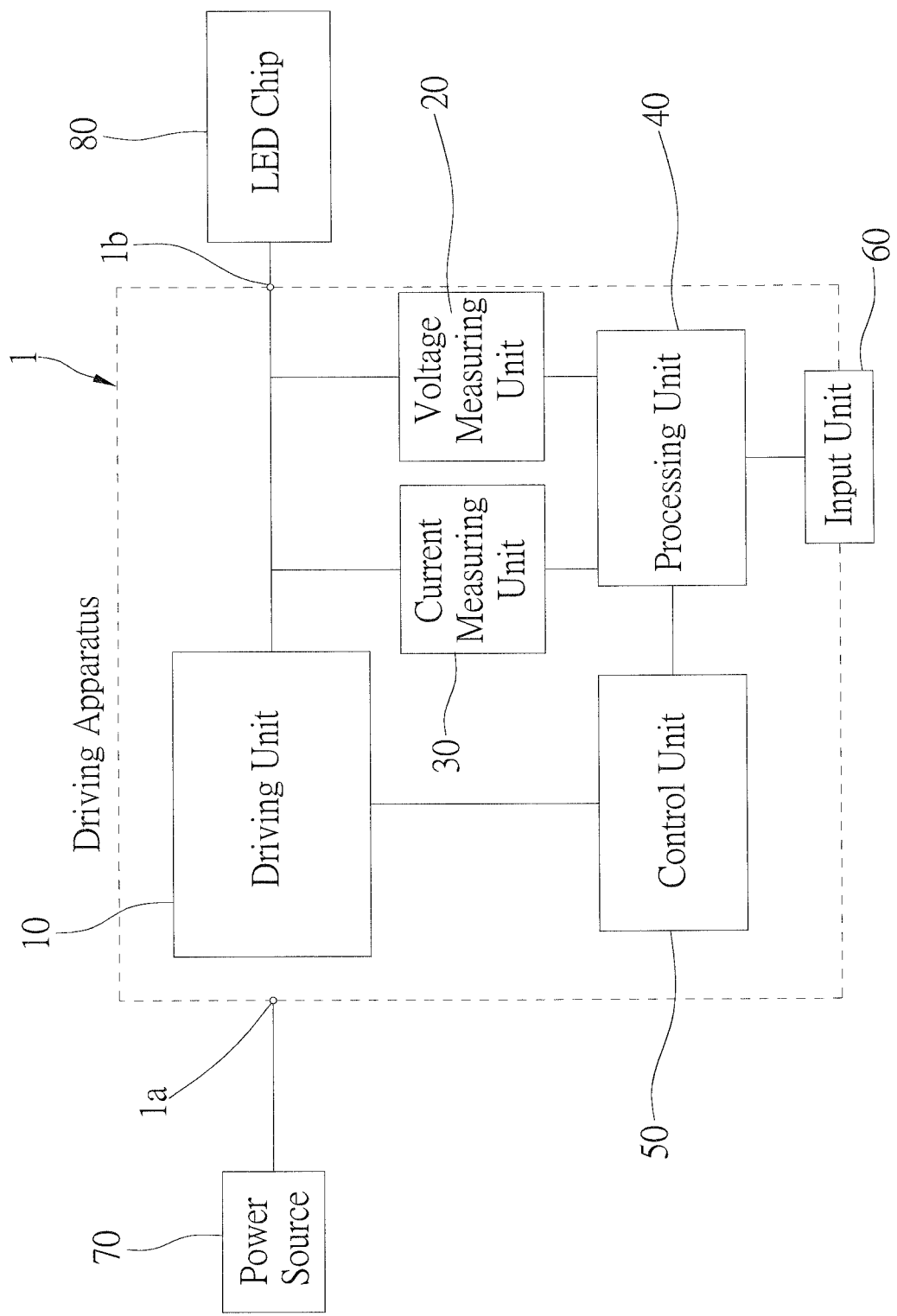
FIG. 3 is a block diagram of a second preferred embodiment of the present invention.

In the second preferred embodiment, a plurality of power values are saved in the processing unit 40 in advance before step A, and the driving apparatus 1 further includes an input unit 60 electrically connected to the processing unit 40, as shown in FIG. 3. In step A, the predetermined power is set by selecting one of the power values through the input unit 60. Whereby, the driving apparatus 1 can be further compatible with LED chips of different rated power. In practice, the design of the input unit 60 can be based on several switches, and a user can set the predetermined power by simply switching the switches.

In the third preferred embodiment, the predetermined power can be set in a different way other than using the input unit 60 as in the second preferred embodiment.

In more details, the method of the third preferred embodiment stores a reference voltage in the processing unit 40 in advance before step A.

Figure 4:
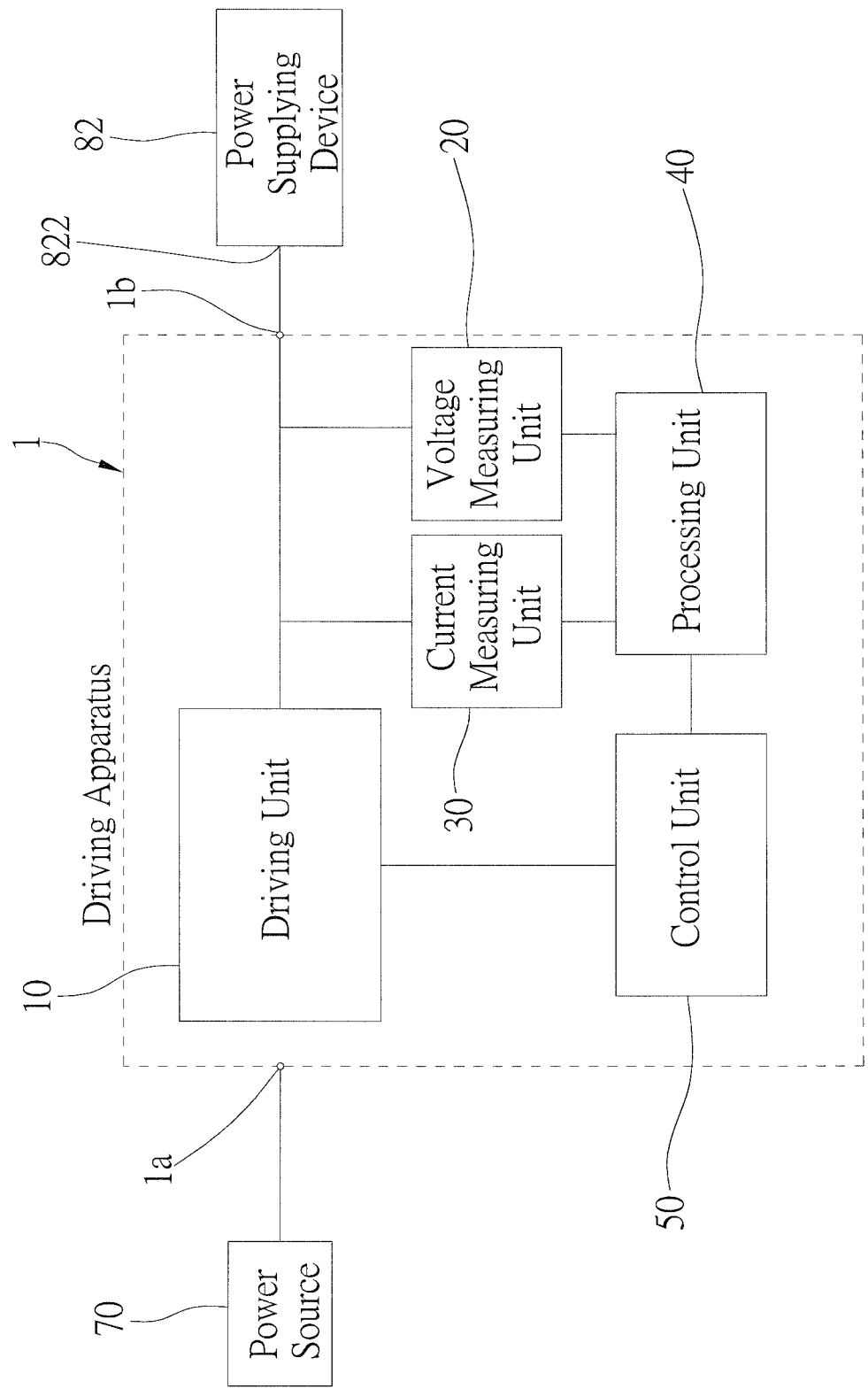
FIG. 4 is a block diagram of a third preferred embodiment of the present invention, showing an alternative way to set the predetermined power.

A power supplying device 82 shown in FIG. 4 is provided, wherein the processing unit 40 has an output terminal 822, from which an output voltage is outputted.

The output terminal 822 of the power supplying device 82 is electrically connected to the output port 1*b* of the driving apparatus 1.

The output voltage of the power supplying device 82 is detected by the voltage measuring unit 20.

Whereby, when the detected output voltage is higher than or equal to the reference voltage, the processing unit 40 sets the predetermined power as a value of the output voltage.

In addition, once the predetermined power is set, the output terminal 822 of the power supplying device 82 is electrically disconnected from the output port 1*b* of the driving apparatus 1, and therefore the power supplying device 82 is electrically disconnected from the driving apparatus 1.

For example, the reference voltage stored in the processing unit 40 is 30V, while the predetermined power is 40 W. If the user intends to set the predetermined power as 32 W, he/she regulates the output voltage of the power supplying device 82 as 32V, and then electrically connects the power supplying device 82 to the output port 1*b* of the driving apparatus 1. At this time point, the voltage measuring unit 20 detects that the output voltage is 32V, and since the value is higher than the reference voltage (30V), the processing unit 40 sets the predetermined power as 32 W. In other words, in the third preferred embodiment, the predetermined power is set by regulating the output voltage of the power supplying device 82.

After that, the output terminal 822 of the power supplying device 82 is disconnected from the output port 1*b* of the driving apparatus 1, and the aforementioned step B to step D can be taken as the previous embodiments. As described above, the working current required to maintain the LED chip 80 being operated at the predetermined power can be obtained in this way. For any other LED chip of different rated voltage and different rated current, as long as its rated power is accordant to the predetermined power value, it is compatible to the driving apparatus 1.

It is noted that as long as the output voltage of the power supplying device 82 falls in the detection capability of the voltage measuring unit 20, no matter what value the predetermined power is required to be, the output voltage can be used to set the predetermined power. Therefore, the driving apparatus 1 is compatible to LED chips of different rated powers, and the driving voltage and the driving current required to be provided to the LED chips can be precisely obtained.

In practice, the driving apparatus 1 can be electrically disconnected from the power supplying device 82 after step A and before step C. In other words, such step can be taken at any time point after the output voltage of the power supplying device 82 is detected, and before the LED chip 80 is electrically connected to the output port 1*b*.

With the method of driving LED chips of same power but different rated voltages and currents, the driving apparatus is compatible to drive all LED chips of the same rated power, even though their rated voltages and rated currents are different from each other, which effectively improves the inconvenience of the conventional way that one driving apparatus can only drive LED chip of one certain specification.

It must be pointed out that the embodiments described above are only some preferred embodiments of the present invention. All equivalent methods which employ the concepts disclosed in this specification and the appended claims should fall within the scope of the present invention.

What is claimed is:

1. A method of driving LED chips of same power but different rated voltages and currents, comprising the steps of:
   A. setting a predetermined power;
   B. connecting a LED chip which has a rated power accordant to the predetermined power;
   C. obtaining a working current of the LED chip while the LED chip is operated at the predetermined power; and
   D. providing a driving current to the LED chip, and maintaining the driving current the same as the working current;
   wherein the working current of the LED chip is obtained by providing the LED chip with the driving current, which is gradually increased from an initial current lower than the working current, and measuring the LED chip to obtain a driving voltage thereof and, therefore, a product of the driving voltage and the driving current; once the product reaches the predetermined power, the driving current is maintained and stopped being increased, and the maintained driving current equals the working current of the LED chip.

2. The method of claim 1, wherein the driving current is provided by a driving apparatus; the predetermined power is set in the driving apparatus in step A for the driving apparatus to drive the LED chip accordingly.

3. The method of claim 2, wherein a plurality of power values are saved in the driving apparatus, and the predetermined power is set by selecting one of the power values.

4. The method of claim 1, wherein the rated power of the LED chip is in a range between 90% and 110% of the predetermined power.

5. The method of claim 1, further comprising:
   E. regulating the driving current to maintain a driving power provided to the LED chip within a predetermined range, wherein the predetermined power is in the predetermined range, and the driving power is a product of the driving current and a driving voltage provided to the LED chip.

6. The method of claim 5, wherein the predetermined range is in a range between 97% and 103% of the predetermined power.

7. The method of claim 1, further comprising maintaining a driving voltage provided to the LED chip no higher than an upper voltage limitation.

8. The method of claim 1, further comprising maintaining the driving current provided to the LED chip no higher than an upper current limitation.

9. The method of claim 2, wherein the driving apparatus has an output port which is adapted to be electrically connected to the LED chip and an output terminal of a power supplying device respectively; the power supplying device outputs an output voltage via the output terminal; the driving apparatus detects the output voltage of the power supplying device to set the predetermined power as a value of the output voltage while doing step A; once the output voltage is detected, the output terminal of the power supplying device is electrically disconnected from the output port of the driving apparatus.

10. The method of claim 9, further comprising setting a reference voltage in the driving apparatus before step A; the predetermined power is set as the value of the output voltage if the output voltage is higher than or equals the reference voltage.

11. The method of claim 9, wherein the output terminal of the power supplying device is electrically disconnected from the output port of the driving apparatus before step A.

12. The method of claim 9, wherein the output terminal of the power supplying device is electrically disconnected from the output port of the driving apparatus after step A and before step C.

* * * * *